G. W. SKINNER.
CORN HUSKING MACHINE.
APPLICATION FILED JUNE 5, 1909.

1,034,152.

Patented July 30, 1912.

Witnesses.
Samuel S. Carr.
Geo. Allendorf.

George W. Skinner, Inventor.
By Robert S. Carr, Atty.

UNITED STATES PATENT OFFICE.

GEORGE W. SKINNER, OF COLLEGE CORNER, OHIO.

CORN-HUSKING MACHINE.

1,034,152.          Specification of Letters Patent.     Patented July 30, 1912.

Application filed June 5, 1909. Serial No. 500,310.

*To all whom it may concern:*

Be it known that I, GEORGE W. SKINNER, a citizen of the United States, residing at College Corner, Ohio, have invented a new and useful Improvement in Corn-Husking Machines, of which the following is a specification.

My invention relates to corn husking machines, and the objects of my improvements are to provide an auto corn cutter and husker, and it consists in a simple and durable construction and assemblage of the various co-acting members for securing facility of operation and efficiency of action.

These objects are attained in the following described manner as illustrated in the accompanying drawings, in which:—

Figure 1:
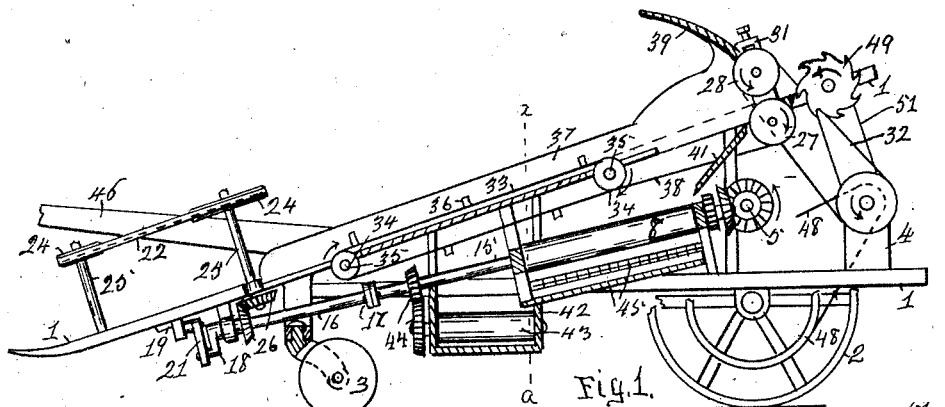
Figure 2:
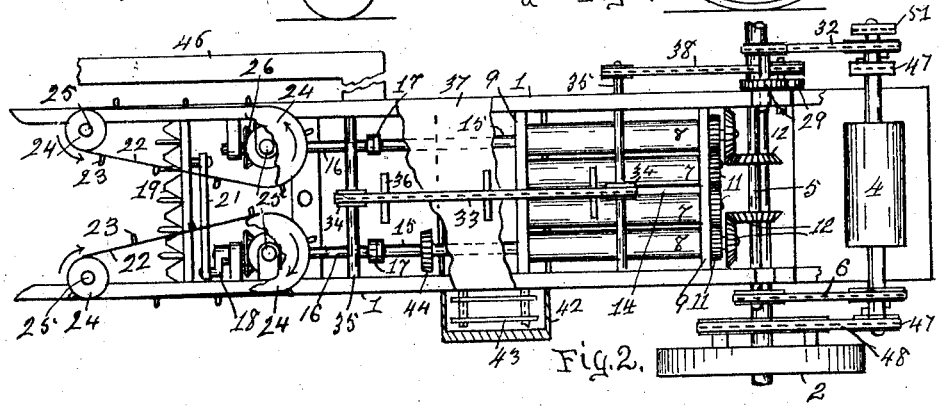
Figures 3, 4:
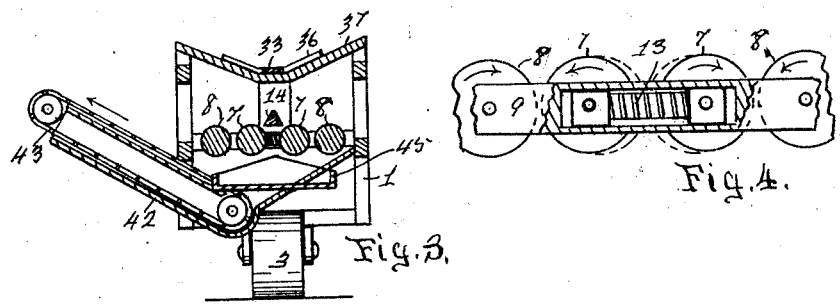

Figure 1 is a longitudinal vertical section of a corn husking machine embodying my improvements; Fig. 2, a plan with parts broken away; Fig. 3, a transverse section on the line $a$—$a$ of Fig. 1, and Fig. 4, a detail of the husking-roller bearings.

In the drawings, 1 represents the supporting frame mounted on rear ground wheels 2 and a front pilot wheel 3. A motor (preferably naphtha) 4 supported on the rear portion of the frame drives the transverse shaft 5 by means of sprocket wheel and chain connections 6 therewith. A series (preferably four) husking rollers 7 and 8 journaled in bearings 9 and connected together by means of spur gears 11 are driven by means of bevel gear connections 12 with the transverse shaft 5. The inner two husking rollers 7 are maintained under a yielding pressure at each end in contact with the adjacent outer rollers 8 by means of compression springs 13 in the ordinary manner, and a separating bar 14 prevents the ears of corn from falling between the two inside rollers 7. The shafts 15 of rollers 8 are extended in a forward direction and detachably secured to the corresponding shafts 16 by means of the ordinary shaft couplings 17. One of the shafts 16 is provided with a crank 18 for driving the cutting sickle 19 by means of the pitman connection 21 therewith. Chains 22 provided with lugs 23 travel on sprocket wheels 24 which are supported on shafts 25 above the sickle and which are driven from the respective shafts 16 by means of bevel gear connections 26 therewith. A snapping roller 27 journaled on the rear portion of the frame is connected with the coacting snapping roller 28 by means of spur gears 29. Said roller 28 is maintained under a yielding pressure in contact with the corresponding roller 27 by means of the ordinary spring actuated bearings 31. Said snapping rollers are driven from the motor by means of a sprocket wheel and chain connections 32 of the roller 28 therewith. An endless chain elevator 33 carried on sprocket wheels 34 which are mounted on the respective transverse shafts 35 is provided with transverse arms 36 for moving the corn along the trough 37 from the cutter to the snapping rolls. Said elevator 33 is driven from the snapping roller 27 by means of sprocket wheel and chain connections 38 therewith. A hood 39 serves to direct the end of the stalks properly between the snapping rollers, and a guide board 41 serves to deliver the ears of corn upon the husking rollers after they have been separated by the snapping rollers from the stalks.

A chute 42 provided with an endless chain elevator 43 which is driven from one of the shafts 15 by means of gear connections 44 therewith serves to receive and deliver the ears of corn from the husking rollers to an accompanying wagon (not shown). A screen covered box 45 supported directly beneath the husking rollers permits the lateral discharge thereover of the husks and serves to separate from the husks and deliver the loose grains of corn into the chute 42. A pole 46 attached to the frame adapts the machine to be drawn by a team of horses.

Clutch members 47 adapted to be engaged in the ordinary manner with the motor shaft serve to drive the traction wheels by means of sprocket wheel and chain connections 48 therewith for either lessening the draft on the team or for making the machine entirely self-propelling as desired. When being self propelled the machine may be provided with any ordinary hand actuated guiding mechanism (not shown) for the pilot wheel. A rotary cutter 49 removably journaled in any ordinary manner in bearings on the rear end of the frame and driven from the motor by means of sprocket wheel and chain connections 51 therewith serves to cut the stalks into short lengths during their discharge from between the snapping rollers.

In operation, the guide chains 22 serve to bend the corn in a rearward direction before it is cut off by the sickle, and to then cause it to fall in proper position in the trough for being fed between the snapping rollers by means of the endless conveyer. During the passage of the corn between the snapping rollers, the ears are severed from the stalks and fall upon the husking rollers and the stalks are cut into short lengths by the rotary cutter. After the husks have been removed from the ears in the ordinary manner by the husking rollers the ears are delivered into the chute and elevated into the accompanying wagon. Shafts 16 may be uncoupled from the corresponding shafts 15 for discontinuing the action of the sickle and guide chains, and thereby adapting the machine for use in the barn for separating and husking the corn from the previously cut fodder.

Having fully described my improvements, what I claim as my invention and desire to secure by Letters Patent of the United States is:—

In a machine for the purpose set forth, the combination with the truck, of the motor thereon, a counter shaft extending transversely of the truck and having two bevel gears thereon, parallel shafts one of which is journaled along each side of the truck, a corn cutting sickle mounted transversely of the forward end of the truck and driven from one of said parallel shafts, vertical feeding device members above said sickle and geared respectively to said parallel shafts, two husking rolls mounted directly and respectively upon said parallel shafts, two intermediate husking rolls geared to said parallel shafts, means for snapping the ears from the corn and delivering them to said husking rolls, and an ear conveyer extending transversely at the delivery end of the husking rolls and geared to one of said parallel shafts.

GEORGE W. SKINNER.

Witnesses:
 M. D. SKINNER,
 R. S. CARR.